United States Patent [19]

Diekhans et al.

[11] Patent Number: 5,043,861

[45] Date of Patent: Aug. 27, 1991

[54] CIRCUIT ARRANGEMENT FOR COMPUTER INPUT/OUTPUT

[75] Inventors: Norbert Diekhans, Gutersloh; Werner Fitzner, Sassenberg, both of Fed. Rep. of Germany

[73] Assignee: Claas OHG, Harsewinkel, Fed. Rep. of Germany

[21] Appl. No.: 307,578

[22] Filed: Feb. 8, 1989

[30] Foreign Application Priority Data

Feb. 8, 1988 [DE] Fed. Rep. of Germany ....... 3803713

[51] Int. Cl.$^5$ ............................................ G05B 11/01
[52] U.S. Cl. .................................................. 364/140
[58] Field of Search .............................. 364/140–147, 364/180, 200, 900

[56] References Cited

U.S. PATENT DOCUMENTS

| | | | |
|---|---|---|---|
| 4,542,452 | 9/1985 | Fukai et al. | 364/141 |
| 4,567,556 | 1/1986 | Onogi et al. | 364/140 |
| 4,570,215 | 2/1986 | Miura et al. | 364/140 |
| 4,593,380 | 6/1986 | Kocher et al. | 364/141 |
| 4,833,589 | 5/1989 | Oshiga et al. | 364/140 |
| 4,872,213 | 10/1989 | Sebald et al. | 364/180 |
| 4,910,659 | 3/1990 | Gates et al. | 364/140 |

FOREIGN PATENT DOCUMENTS 3537399 4/1986 Fed. Rep. of Germany.

OTHER PUBLICATIONS

Design & Elektronik, No. 17, Aug. 18, 1987, pp. 90 and 91, "Intelligentes Interface für die ProzeBsteuerung", by Peter Zimmerman and Uwe Tews.

Primary Examiner—Jerry Smith
Assistant Examiner—Jim Trammell
Attorney, Agent, or Firm—Browdy and Neimark

[57] ABSTRACT

A circuit arrangement consisting of a computer processor from which a connecting bus extends and a circuit board is connected to a bus which carries switching amplifiers the outputs of which are connected via peripheral connector contacts to load circuits is shown. Threshold discriminator circuits and analog signal amplifiers are connected to the connector contacts, and the bus output signals are fed via the connecting bus the processor. The working of the load circuits and further attached signals are evaluated by the processor.

13 Claims, 4 Drawing Sheets

CIRCUIT ARRANGEMENT FOR COMPUTER INPUT/OUTPUT

BACKGROUND OF THE INVENTION

1. Field of the Invention

The invention relates to a circuit arrangement with at least one circuit board which, at the input side can be removably connected via input contacts with control outputs, digital signal inputs, analog signal inputs, clock signal inputs and/or message signal connections of a computer processor, and which has at the output side at least one multi-pin plug connector, the contacts of which are designed to be connected with users or loads, emitter contacts, analog signal emitters, frequency signal emitters and/or message circuits, and where input or output circuits, such as a circuit amplifier, a threshold value discriminator, an amplifier, a filter circuit and/or an adapter circuit are placed between the input contacts and the output contacts.

2. The Prior Art

In known input/output circuit arrangements for computers, a plurality of input and output circuits are disposed on a printed circuit board, which are connected at one side with a data and control signal bus and at the other side, via a pluggable cable connector, with sensors, switches or users, such as magnetic coils, motors, etc. The number of cable connection points on the circuit board is limited by spatial considerations and, within the range of the predetermined maximum number, the circuit board is provided with a varying number of input or output circuits, depending on the requirements of the individual input/output device which is to be connected, so that, depending on the different uses, a great many different circuit boards must be designed and stored for each computer.

SUMMARY OF THE INVENTION

It is an object of the invention to disclose a circuit arrangement and a method for its use in which, with a predetermined number of cable connection points, a more universal use of an input/output circuit board is achieved for a large number of various input/output devices. This object is attained in that several of the input/output circuits are connected to the output contacts on the input/output circuit board. Advantageous embodiments are described in the dependent claims, which can also be advantageously used in combination.

In many cases the circuit arrangement makes it possible in an advantageous manner to reduce the plug contacts as well as the cables to the users and sensors. In particular, this reduction may occur if users and signal contacts or signal emitters are placed spatially adjacent at one end of the cable or if many signal contact emitters or analog signal emitters are disposed spatially configured in such a way that they can be connected in lines or matrices and can be evaluated in a control operation. In the latter case, multiplex considerable savings in electronic components of the input and output circuits are achieved.

The users connected to the outputs often are electric motors, magnetic coils or heat generators which, because of their inertia, have an integration effect, so that during multiplex operation their activation for a short time, compared with their initial start-up, extraction or heating time, or else short interruptions of current, have no noticable effects, compared to the wind-down, releasing or cool-down time. As long as the interruptions in the multiplex operation take place in a narrow window of time which is less than the frequency of the change of the switching state or of the practically possible reaction times thereto, reliable function of input processing is assured.

The contacts, sensors and users of the various input/output devices are connected via a cable to the common plug and are connected by means of the latter with the input/output circuit board. Drive of the input and output circuits and the evaluation of signals is entirely program-controlled in accordance with the use of the circuits in connection with the device selected in each case. A subordinate utility routine is used as a practical aid for this and controls an external overlay and internal separation of the input and output functions during multiplex operation.

To increase the universality of the circuit board it is also advantageous to connect additionally at least one of the standardized serial interfaces for data message transfer to the contacts. For certain input/output devices, circuit boards with partial assemblies may be used to allow a cost savings, however, for replacement and repair purposes only a fully assembled universal circuit board should be stocked.

Furthermore, wiring of the output lines with the input circuits makes it possible in an advantageous manner to perform a running functional analysis of the output circuit and the associated user, as well as the wiring. In the same way the input circuits can be continuously checked. Checking is performed with the aid of a respective subordinated utility routine by means of periodic control of the output circuit amplifiers and an associated input signal evaluation. Advantageous embodiments are shown in FIGS. 1 to 3.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The invention of the present application will now be described in more detail with reference to the preferred embodiments of the device, given only by way of example, and with reference to the accompanying drawings, in which.

DETAILED DESCRIPTION OF THE PREFERRED EMBODIMENTS

Figure 1:
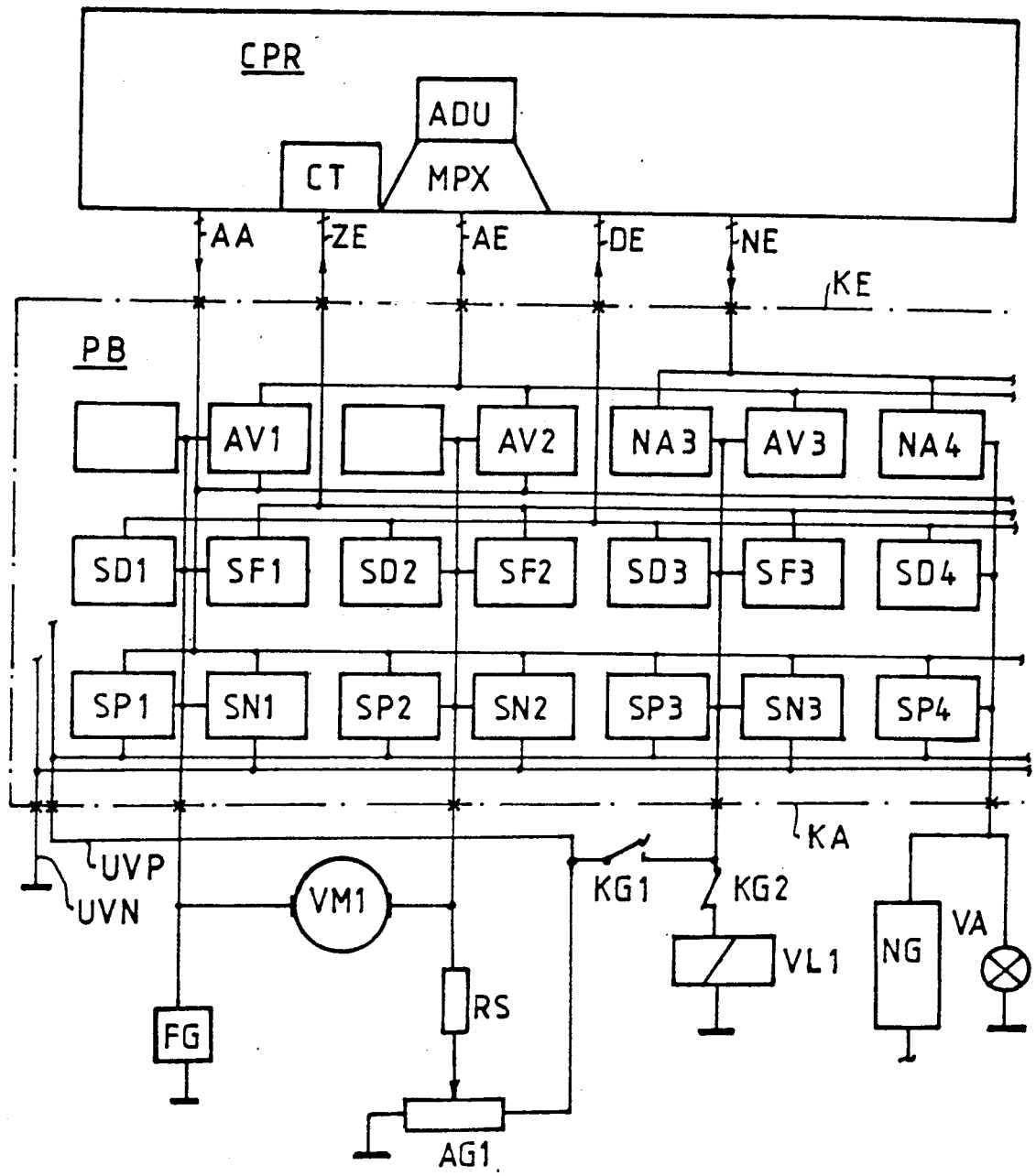
FIG. 1 is a general circuit block diagram.

FIG. 1 is a general diagram with a section of the circuit board (PB). The processor (CPR) of the computer is connected with the circuit board (PB) via the plug connector (KE), which includes five busses (AA, ZE, AE, DE, NE), namely control outputs (AA), clock signal inputs (ZE), analog signal inputs (AE), digital signal inputs (DE) and message signal connections (NE), for which corresponding connections are provided on the processor. The clock signal inputs (ZE) are connected to counters (CT) in the processor (CPR), which can be set and read depending on the program.

Furthermore, the analog signal inputs (AE) are connected to a multiplexer (MPX), with an analog digital transducer (ADU) connected downstream of the multiplexer (MPX), both of which are controllable in dependence on the program and the digital output signal readable from the program. Output contacts (KA) are disposed on the circuit board (PB), only a few of which are shown. Two of the contacts (KA) are connected With supply voltage connectors (UVN, UVP), one of which is preferably connected to ground. The remaining contacts (KA) are each connected on the circuit board (PB) with a number of input and/or output circuits. The output circuits are controllable circuit amplifiers (SP1-SP3; SN1-SN3), which can be controllably connected with the positive or negative supply voltage line (UVP, UVN). Detailed control takes place via the control outputs (AA) of the processors (CPR). Preferably, MOS-FET transistors with low residual resistance and high insulating resistance are provided.

Threshold value discriminators (SD1, SD2, SD3) are connected with the contacts (KA), the threshold of which preferably is affected by hysteresis and is set for a predetermined value within the range of the supply voltage (UVP, UNP). The digital output signal of each of the threshold value discriminators (SDI, SD2, SD3) is routed via a bus to a digital signal input (DE) of the processor (CPR). Furthermore, a filter circuit (SF1, SF2, SF3) is connected to each of the contacts (KA). connection preferably is ungrounded, e.g., capacitive, so that a signal emitted by an externally connected frequency signal emitter (FG) is received there, is formed and routed to one of the clock signal inputs (ZE), provided that the circuit amplifiers (SP1, SN1) connected to the associated contact (KA) are switched to high impedance.

Furthermore, one amplifier (AV1, AV2) is connected to each of the contacts (KA), the output signal of which is routed to one of the inputs of the multiplexer (MPX). The degree of amplification of the amplifiers (AV1, AV2) is practically controllable by the processor (CPR) by use of the control outputs (AA). The test signal at the signal emitter (AG1), which is shown as a potentiometer supplied with the supply voltage (UVP-UVN), is routed via a high-impedance protective resistor (RS) to one of contacts (KA). Provided that the circuit amplifiers (SP1, SP2; SN1, SN2), coupled with the corresponding user (VM1), are controlled with high impedance, the test signal of the signal emitter (AG1), which is amplified by the amplifier (AV2), is routed to the multiplexer (MPX). Provided that the user or load (VM1) is the armature of a motor, its rotational direction can be set by a corresponding change in switching the circuit amplifiers (SP1, SP2; SN2, SN1) on or off. Speed and direction of rotation of the armature can be determined by measuring the armature voltage during the currentless state, where only one of each of the ground-connected circuit amplifiers (SN1, SN2) is closed and the signal is routed from the respective other contact (KA) via the amplifier (AV2, AV1) to the multiplexer (MPX). The signal emitter (AG1), which has a high impedance compared to the resistance on the inside of the armature, does not interfere with this rpm measurement.

By means of repeated measuring of the rpm in the currentless state, the function of and load on the motor can be determined by measuring the speed of the rpm reduction and comparing it with a previously known value. If the rpm fall off too quickly, issuance of warning information is provided. This monitoring of the limit value can also be performed with the connected threshold value discriminators (SD1, SD2), the time of the test of the respective digital signal input being important for the respective emitted limit value condition of the speed reduction, or for which the time of falling below the threshold value is determined and the elapsed time is measured and used as a measure for the speed reduction.

A further multi-functional use of the contacts is shown in connection with the inductive user (VL1), which is, for example, the coil of a hydraulic valve. This user (VL1) can be directly supplied with current via a key-contact emitter (KG1) which can be used, for example, for emergency operations during loss of a control circuit. Furthermore it is possible, through monitoring of the output signal of the threshold value discriminator (SD3), to detect the contact actuation from the processor (CPR), for which purpose the latter briefly controls the circuit amplifier (SP3) with high impedance during the evaluation. In a previously agreed way it is possible to signal to the processor the correspondingly desired operational condition by means of the length of keying or the respective keying intervals.

Another contact emitter (KG2 is additionally switched in series with the user (VL1) and may be, for example, a thermal protective contact. The opened or closed state of this contact emitter (KG2) and the presence of the user (VL1) is determined by measuring the time elapsed after the circuit amplifier (SP3) is switched off until the associated threshold value discriminator (SD3) has signaled the falling below the threshold value. If there is inductivity of the user (VL1) and the contact emitter (KG2) is closed, voltage falls off rapidly; otherwise the line capacitance maintains the charge considerably longer.

A further output circuit may be used, for example, for supplying current to a high-impedance lamp current user (VA). Furthermore, when the respective circuit amplifier is switched off, the same contact (KA) may be used for message signal transmission for an external message circuit (NG), the signals of which are converted in an adaptation circuit of a known type, e.g. in the manner of a V24 standard interface, and are exchanged with the processor CPR). The threshold value discriminator (SD4) at the same contact (KA) is used to monitor the level. The input signals can be controlled by the program by means of an interrupt signal or can be periodically evaluated, for which a subordinate utility routine is present in the processor (CPR). It is also possible to operate individual digital signal inputs (DE) through the program, if required, by the activation of an associated interrupt input.

Figure 2:
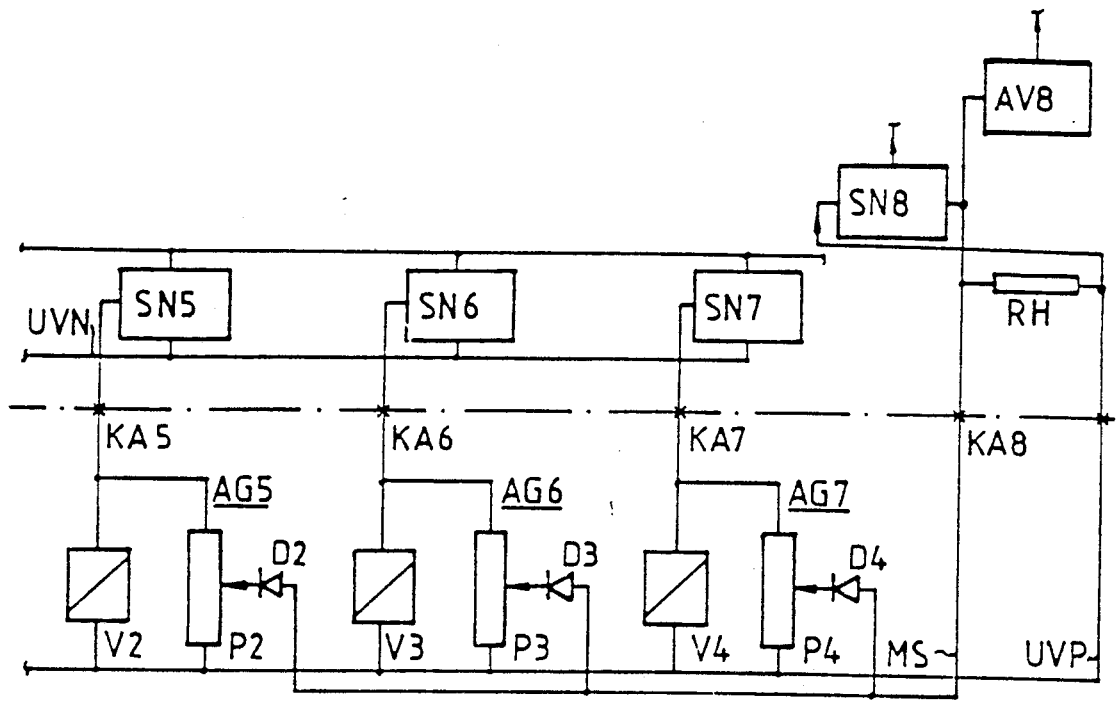
FIGS. 2 and 3 are detailed circuits for various uses in multiplex operation.

FIG. 2 is a further section of the circuit board with external switching which is to be operated in a multiplex mode. Three users (V2, V3, V4) and three signal emitters (AG5, AG6, AG7) are connected in pairs to the contacts (KA5, KA6, KA7). The users (V2, V3, V4) can each be Provided with current controlled by an associated circuit amplifier (SN5, SN6, SN7). The signal emitters are shown in the form of potentiometers (P2, P3, P4); however, they may also be resistor networks made of variable resistors or active emitters. They are switched in parallel with the users (V2, V3, V4). The emitter signals are collected on a collecting line (MS) via crystal diodes, shown as diodes (D2, D3, D4), but which also may be transistors with reduced voltage drop, and are routed to one of the contacts (KA8) to which is connected one of the amplifiers (AV8) and practically one of the threshold value detectors (SD8). It is furthermore practical to route a load resistor (RH), of high-impedance compared with the measured value emitters (F2, P3, P4), or a power source from the contact, to the supply voltage (UVP), which puts a small load on the crystal diodes (D2, D3, D4).

To measure the different emitter signals, the processor switches only one of the circuit amplifiers (SN5, SN6, SN7) into a conducting state, so that the supply voltage difference (UVP-UVN) lies on the associated emitter (AG5, AG6, AG7) and the associated measuring signal appears for evaluation at the input circuits (AV8, SD8). If several of the circuit amplifiers (SN5, SN6, SN7) are switched on, the respectively lowest of the measuring signals appears for evaluation. In this manner the minimal signal is detected directly by the crystal diode coupling, which saves a separate calculating step. Generation of the discriminator threshold value is advantageously provided by the division of the supply voltage (UVP), so that the threshold acts relative to the potentiometer position in each case.

Figure 3:
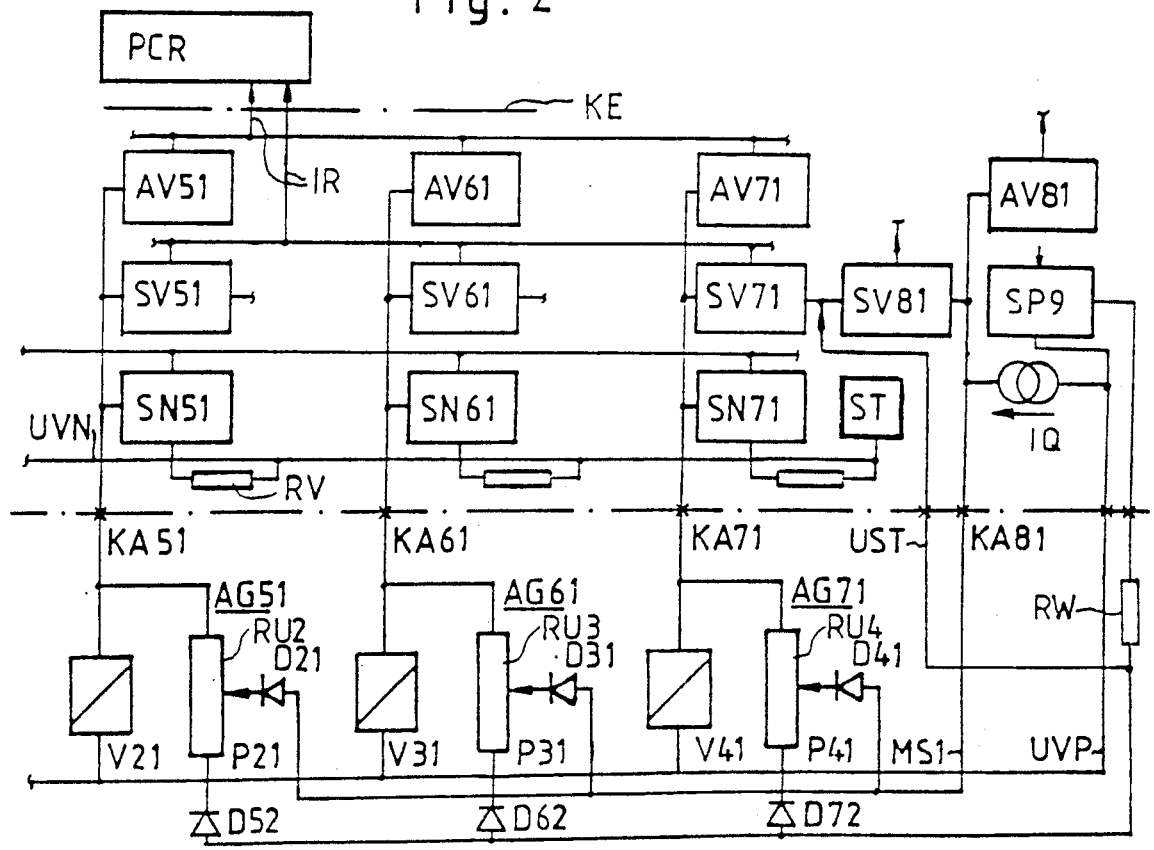

FIG. 3 is a further section of the circuit with the associated external switching. This circuit corresponds to a large degree to that of FIG. 2 and the corresponding reference numerals have each been assigned a complimentary "1". The voltage supply for the ends of the potentiometers is different and takes place via decoupling crystal diodes (D52, D62, D72) by means of a switchable circuit amplifier (SP9), and furthermore the measurement collecting line (MS1) is supplied by a current source (IQ). Because of this, it is possible to measure the partial resistors (RU2, RU3, RU4) of the potentiometers (P21, P31, P41) by high-impedance control of the switchable circuit amplifier (SP9), which supplies the ends of the potentiometers, while one of the switchable circuit amplifiers (SN51, SN61, SN71) on the other side of the potentiometers (P21, P31, P41) is switched to conduct current, so that the current from the current source (IQ) forms a corresponding measurable voltage drop at the partial resistors (RU2, RU3, RU4). If, however, the ends of the potentiometers are supplied with voltage, a circuit analog to FIG. 2 is present, in which the divider voltage of the potentiometers (P21, P31, P41) must be measured. The circuit is also usable for pure resistance emitters, in which case the crystal diode (D52, D62, D72) and the voltage wiring is omitted, because resistance is measured by means of the current supplied.

The voltage supplied to the potentiometer ends via the circuit amplifier (SP9) is advantageously stabilized by means of a voltage stabilizer (ST), which is connected via a preresistor (RW) with the supply voltage (UVP). In this manner the measured values can be directly evaluated without reference to the supply voltage. Operation of the stabilizer (ST) can be tested by the evaluation of the measurement signal when all grounded circuit amplifiers (SN51, SN61, SN71) are switched off.

In the arrangement according to FIG. 2 it is also possible to measure the supply voltage (UVP) when the grounded circuit amplifiers (SN5, SN6, SN7) are switched off. The measured voltages at the potentiometer taps must be related to this supply voltage. By means of this an exact evaluation of the potentiometer position is possible, even with a great variance in the supply voltage (UVP), for example in operations with batteries or vehicle batteries.

Figure 5:
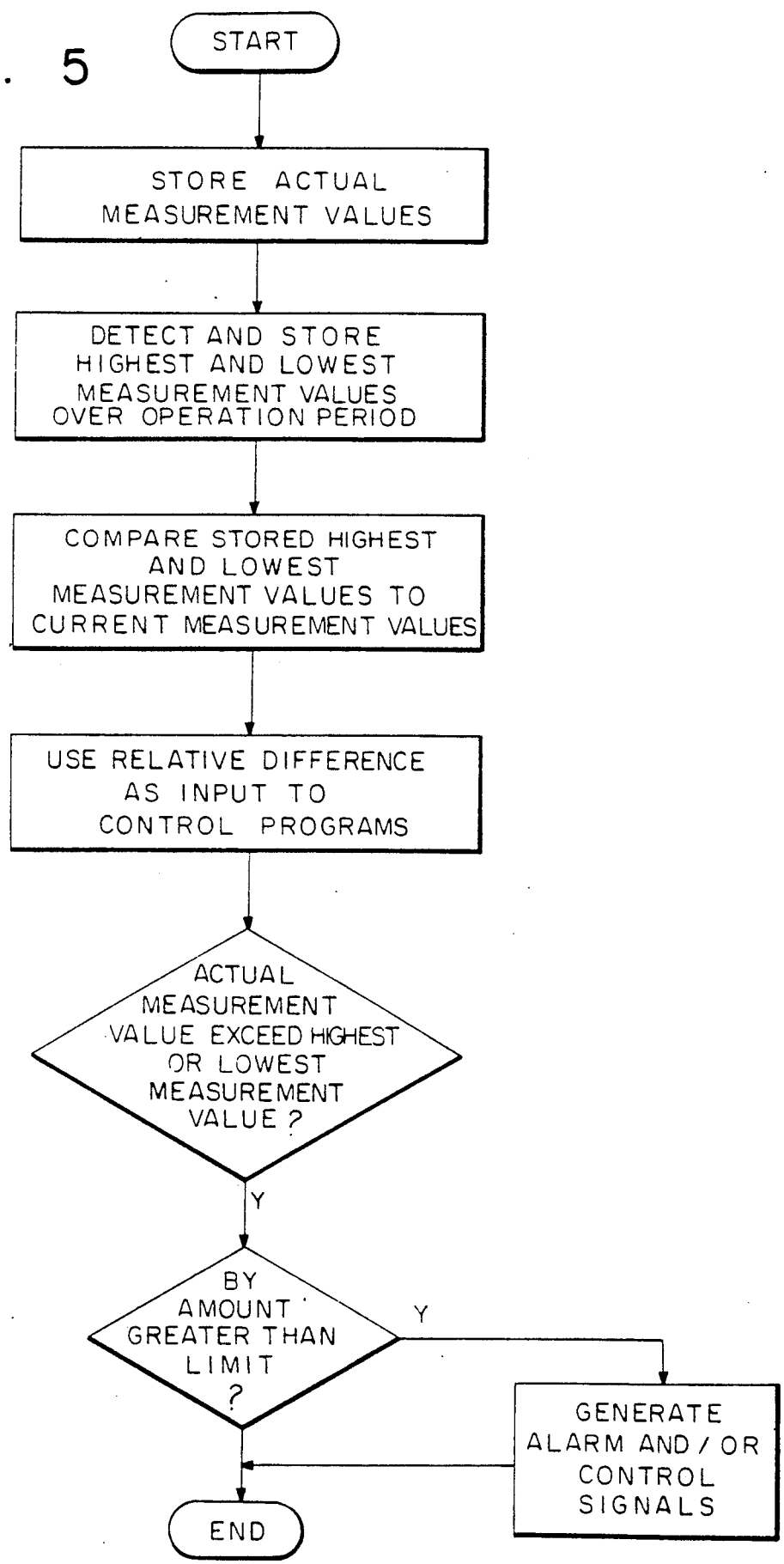

An advantageous use of the circuit arrangement in accordance with FIG. 3 is attained in that the signals of the amplifiers (AV51, AV61, AV71) of the threshold value discriminators (SD51, SD61, SD71) are evaluated at a time when current flows through the associated circuit amplifiers. The voltage drop at the circuit amplifiers, which is then measurable by means of the amplifier signals or threshold control signals, indicates overload or a short circuit of the user or malfunction of a circuit amplifier when a threshold value is exceeded, which is used for a quick disconnect and an alarm signal, as shown in FIG. 5. This function can be improved by the addition of a low-impedance serial current measurement resistor (RV) into the circuit amplifier supply line, because of which a defined measurement signal is generated even with circuit amplifiers with very low impedance or with low user current. It is furthermore possible, in case the users (V21, V31, V41) are inductive users or armatures of motors which act as generators, to measure and evaluate the course over time of the disconnect voltages, which indicate inductivity and thus the switched state, or the generator voltage which corresponds to the rpm, in that after the corresponding circuit amplifier is switched off, the signal of the associated threshold value discriminators (SD51, SD61, SD71) or amplifiers (AV51, AV61, AV71) is received by the processor.

Evaluation of the operational values exceeding the threshold value may take place periodically, preferably within the scope of the multiplex program for measurement value detection, or it can be performed interrupt-controlled when an interrupt input (IR) of the processor (PCR) is suitably wired.

Figure 4:
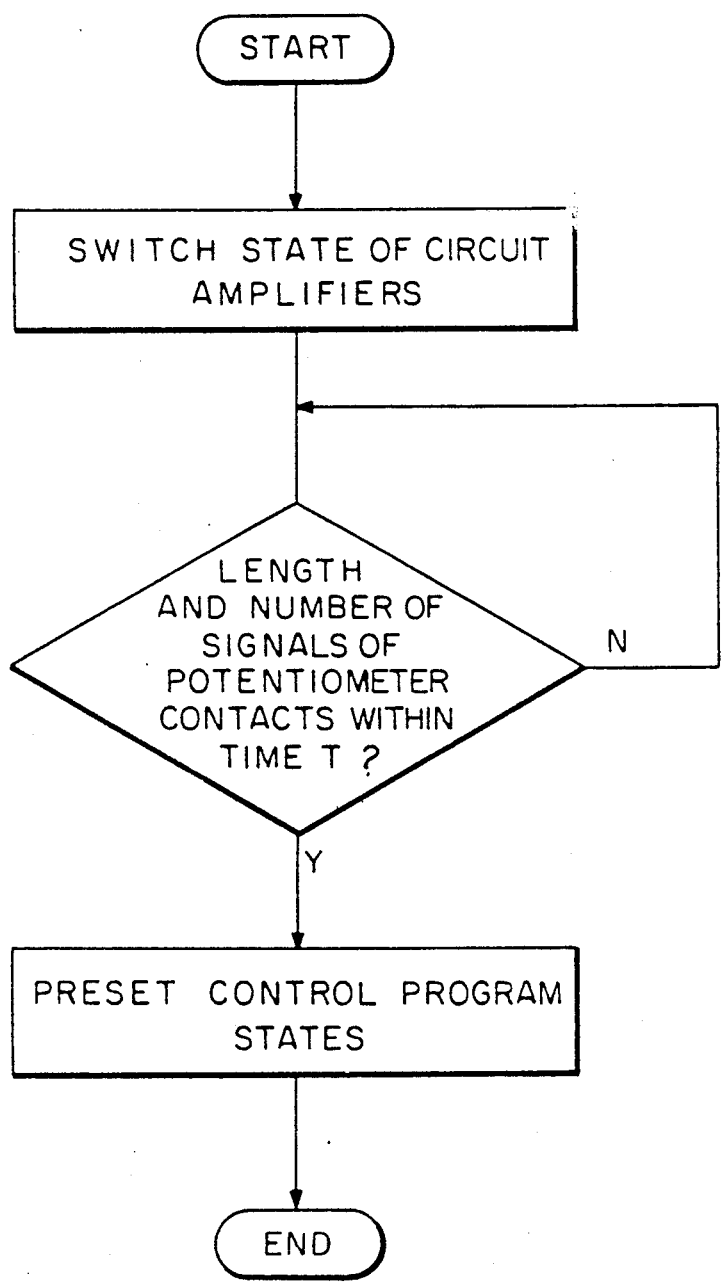
FIGS. 4 and 5 are flow diagrams of the control program according to the present invention.

A particularly advantageous evaluation of output signals of potentiometers, which are connected as emitters to mechanical sensors and are us®d in a particular mechanical work sector which is not equivalent to the full resistance range of the potentiometer, is achieved in that a highest and lowest measurement value each is stored in association with each potentiometer (P21, P31, P41, and in that a comparison with the highest and lowest measurement value is performed during each of the periodic measuring operations, in that the stored highest or lowest measurement value is updated when it is exceeded in either direction and in that the evaluation of the actual measurement value is performed in relation to the range lying between the associated highest and lowest measurement value, as shown in FIG. 4.

The following equipment for an input/output circuit board with 25 output contacts has proven to be particularly advantageous:

1 measurement signal input; 1 stabilizer voltage connector; 4 supply voltage connectors—2 each parallel; Contact 1 to 19 with threshold value discriminators which can also be switched by the program to clock inputs and interruptors; Contacts 1 to 11 with amplifiers, seven of which are controllable; Contacts 1,2; 3,4; 16,17; 18,19 with altogether 4 message channels; Contacts 8 to 15 with circuit amplifiers to the negative supply voltage; and Contacts 12 to 19 with circuit amplifiers to the positive supply voltage.

The message channels may be used for communication between several circuit arrangements of the same type which for example control different components of a total system, or connect to a maintenance processor or connect to an externally disposed input/output expansion device. For example, a processor with one or more input/output circuit boards can be used for the control and monitoring of an internal combustion engine, a further processor, likewise equipped, for chassis control and a third for the control of an operating device disposed on the motor-driven vehicle. Data exchange then is used advantageously for, for example, the exchange of load conditions of the operating device, for affecting the speed of the drive device and for output demand from the internal combustion engine regarding work and drive output.

Because the processors and the input/output circuits are all the same and only contain different programs, they can be exchanged amongst each other in case of the loss of one of the components and are easily replaceable if a single processor and a single input/output circuit board is stocked. If the total operation is reduced, e.g., the control of the engine efficiency is omitted, it is also possible to continue the operation of the most important parts of the device by means of the remaining functional components guided, controlled and monitored by the computer.

According to a preferred embodiment of the invention, one of the measuring resistor or potentiometer contacts, which is used for an external direct starting of the associated user, is disposed switched parallel with the circuit amplifier, and/or one of the measuring resistor or potentiometer contacts is disposed switched in series with the circuit amplifier which is used for the external direct starting of the associated user. The output signal of the threshold value discriminator is checked periodically by the processor to determine the position of the measuring resistor or potentiometer contacts and the respective associated circuit amplifier is brought into a currentless state, controlled by the processor.

One of two output contacts, between which the user is connected, is connected on one side with a threshold value discriminator and/or an analog signal amplifier, and on its other side an analog signal emitter is connected, via a high-impedance protective resistor, and output signals of the threshold value discriminators and/or the amplifiers are checked periodically by the processor to determine and evaluate an actual resistance value at the measuring resistor or potentiometer contact, the respective associated circuit amplifiers being brought briefly into a currentless state, controlled by the processor.

Two output contacts, between which the user is connected, are respectively connected with an analog signal amplifier and the analog signals of the amplifiers are periodically evaluated individually. Their difference is also evaluated by the processor, while the circuit amplifiers are switched free of current, for the determination of the respective voltage at the user.

One of the output contacts, which is connected with one of the circuit amplifiers, is connected with one of the threshold value discriminators and/or one of the analog signal amplifiers, and a discriminator output signal or analog signal output therefrom is evaluated periodically or interrupt-controlled by the processor, while the circuit amplifier is switched to carry current.

At least one of the circuit amplifiers is connected in series at the output contact with a low-impedance current measurement resistor.

Potentiometers or resistance dividers with a measurement resistor are respectively switched parallel to several of the users as the measuring resistors, taps of which are each routed via a crystal diode together with a measurement line to a contact, to which is connected an amplifier and/or a threshold value discriminator. The output signal of the amplifier or the discriminator can be periodically evaluated by the processor, the latter either switching only one of the circuit amplifiers to carry current or, for the purpose of an immediate determination of the respectively lowest of the associated tap voltages, switching several of the circuit amplifiers to carry current.

On a measurement line loaded with high impedance relative to the supply voltage, there is a signal evaluation relative to the respective height of the supply voltage measured when all the associated circuit amplifiers are switched to be currentless, and/or is supplied to the threshold value discriminator, divided according to a threshold height, in the form of a threshold value.

A circuit arrangement is provided wherein at several of the contacts, which are connected with circuit amplifiers and users, which are supplied by the supply voltage, the measuring resistors are connected, which are measurement resistors or partial resistors of potentiometers, which are together routed respectively either with their other ends or at the side of their taps via a crystal diode to a contact to which is connected a current source and an amplifier and/or a threshold value discriminator, the output signal of each of which can be evaluated periodically by the processor, while respectively only one of the circuit amplifiers is switched to carry current.

A circuit arrangement is provided wherein the potentiometers or preresistors of the measurement resistors are each routed together via a crystal diode to a contact which can be connected, controlled by the associated circuit amplifier, with a stabilizing voltage which lies below the supply voltage and which is supplied to the threshold value discriminators for the purpose of forming the threshold value.

The processor contains a control program which performs the steps of periodically and relatively briefly, compared with the length of a cycle and with a reaction time of the respectively connected users, putting the circuit amplifiers into such switching states as are associated with the required measurement signal evaluation and then subsequently returning them to the previous operational state.

The program further performs the steps of evaluating the high and low resistance states of the measuring resistor or potentiometer contacts as to their length and/or their number within a predetermined time and presetting corresponding control program states for a succeeding program run.

The program further performs the steps of storing the periodically gained actual measurement values and, associated therewith, detecting and storing the highest and lowest measurement values over a total period of operation, comparing the stored highest and lowest measurement values with the current measurement values and, if required, updating the actual measurement values in relation to the associated highest and lowest measurement values being made available as input values for control programs.

The program further performs the steps of detecting the relative difference of the actual values from the associated highest and lowest measurement values when the latter are exceeded in either direction and comparing the relative difference with a limit value and, if the limit value is exceeded, issuing an alarm signal state and/or a control signal.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A circuit board arrangement comprising in combination:
    a computer processor having inputs and controlled output;
    a bus having connection contacts;
    at least one circuit board having connection contacts for connecting to said bus and said connection contact;
    at least one switching analog amplifier connected to said processor controlled output, said amplifier having outputs which are removably connected by peripheral contacts to at least one load circuit;
    at least one threshold discriminator circuit located on said circuit board, said discriminator having an input connected to said switching amplifier output, and said discriminator having an output connected by said bus connector contacts to said processor inputs;
    wherein said at least one switching amplifier and said at least discriminator are mounted on said circuit board, and said amplifier and said discriminator are connected to peripheral connector contacts;
    an analog amplifier circuit mounted on said circuit board said analog amplifier having an output connected to said bus and to an analog signal input of said processor;
    wherein said peripheral connection is connected to an analog signal source.

2. A circuit arrangement in accordance with claim 1, further comprising on the same circuit board at least one second switching amplifier is arranged which controllably connected to the control outputs of the processor and which at its output side is connected to one of the peripheral connector contracts, one of said switching amplifiers is to be switched to a positive supply voltage and the corresponding second switching amplifier is to be switched to a negative supply voltage.

3. A circuit arrangement in accordance with claim 2, further comprising two of the first switching amplifiers which are to be switched to the positive voltage and two of the second switching amplifiers which are to be switched to the negative voltage which are connected via the two corresponding peripheral connector contacts to a DC motor being the load circuit.

4. A circuit arrangement in accordance with claim 3, wherein to one of the two peripheral connector contacts the analog signal source is connected via a high-impedance protective resistor, and under control of the processor periodically the corresponding switching amplifiers switch into a currentless state whereby the processor evaluates the output signals delivered by the corresponding threshold value discriminator circuits or the analog amplifiers thereby determining the actual analog signal value.

5. A circuit arrangement in accordance with claim 3, wherein under control of the processor periodically the switching amplifiers switch into a currentless state whereby the output signals of the corresponding analog amplifiers are evaluated and the difference there between are evaluated by the processor for the determination of the respective voltage at the load circuit.

6. A circuit arrangement in accordance with claim 1, further comprising a measuring resistor or a potentiometer contact which is connected to the peripheral connector contact thereby being the analog signal source.

7. A circuit arrangement in accordance with claim 6, wherein under control of the processor periodically the switching amplifiers switches into a currentless state whereby the processor evaluates the output signals delivered by the corresponding analog amplifiers and the corresponding threshold value discriminator circuits.

8. A circuit arrangement in accordance with claim 1, comprising a low-impedance current measurement resistor which is connected between the output side of the switching amplifier and the peripheral connector contact, and wherein the threshold discriminator circuit output signal or the analog amplifier output signal is periodically evaluated while the switching amplifier is switched to carry current.

9. A circuit arrangement in accordance with claim 1, wherein parallel to each of several of the load circuits a potentiometer or a resistance divider is arranged the taps of which each via a crystal diode are routed together to one of the peripheral connector contacts which on the circuit board is connected to one of the analog amplifiers or threshold value discriminator periodically is evaluated by the processor while one or all of the respective switching amplifiers connected to the said load circuits are switched to carry current.

10. A circuit arrangement in accordance with claim 1, wherein to each of several of the load circuits which are at one and connector to the supply voltage a potentiometer or a resistance divider is connected which each via crystal diode are routed together with a current source to one of the peripheral connector contacts to which one of the analog amplifiers or one of the threshold value discriminators are connected, the output signal of which periodically is evaluated while only one of the respective switching amplifiers connected to said load circuits is switched to carry current at a time.

11. A circuit arrangement in accordance with claim 10, wherein the potentiometers or resistance dividers each via a crystal diode are routed together to one of the peripheral connector contacts the switching amplifier connected to which is connected at its supply side to a stabilized voltage which lies below the supply voltage and which stabilized voltage is supplied to the threshold value discriminator circuits forming a threshold value.

12. A circuit arrangement in accordance with claim 1, wherein the processor periodically gains a current measurement value from at least one of the analog amplifier output signals and associated therewith the processor is detecting and storing the highest and lowest measurement values over a period of operation, and comparing the stored highest and lowest measurement values with the current measurement values and if required updating the stored highest or lowest measurement values.

13. A circuit arrangement in accordance with claim 12, the processor further is detecting the relation difference of the actual values from the associated highest and lowest measurement values when the latter are exceeded in either direction and comparing the relative difference with a limit value and, if the limit value is exceeded, issuing an alarm signal state.

* * * * *